(12) United States Patent
Kurzenberger et al.

(10) Patent No.: US 9,561,599 B2
(45) Date of Patent: Feb. 7, 2017

(54) HAND-HELD WORK IMPLEMENT

(71) Applicant: ANDREAS STIHL AG & CO. KG, Waiblingen (DE)

(72) Inventors: Jan Kurzenberger, Köngen (DE); Jens Knauβ, Remshalden (DE); Johannes Menzel, Wernau (DE); Sebastian Friedrich, Korb (DE)

(73) Assignee: ANDREAS STIHL AG & CO. KG, Waiblingen (DE)

( * ) Notice: Subject to any disclaimer, the term of this patent is extended or adjusted under 35 U.S.C. 154(b) by 225 days.

(21) Appl. No.: 14/444,021

(22) Filed: Jul. 28, 2014

(65) Prior Publication Data

US 2015/0026988 A1 Jan. 29, 2015

(30) Foreign Application Priority Data

Jul. 27, 2013 (DE) .................. 10 2013 012 513

(51) Int. Cl.
*B27B 17/00* (2006.01)
*F02F 1/24* (2006.01)
(Continued)

(52) U.S. Cl.
CPC ........... *B27B 17/0033* (2013.01); *B25F 5/006* (2013.01); *B25F 5/008* (2013.01); *B27B 17/08* (2013.01);
(Continued)

(58) Field of Classification Search
CPC ...... B27B 17/0033; B27B 17/08; B25F 5/006; B25F 5/008; F02F 1/065; F02F 1/242; F16F 15/00; F02B 63/02
See application file for complete search history.

(56) References Cited

U.S. PATENT DOCUMENTS 5,046,566 A * 9/1991 Dorner .................. F16F 1/3732
173/162.2
5,368,107 A * 11/1994 Taomo ..................... B25F 5/006
173/162.2
(Continued)

FOREIGN PATENT DOCUMENTS

DE 101 24 621 A1 12/2002
DE 103 61 295 A1 7/2005
(Continued)

OTHER PUBLICATIONS

European Search Report, Appl. No. 14002514.9, Aug. 25, 2015, 4 pgs.
(Continued)

*Primary Examiner* — Hwei C Payer
(74) *Attorney, Agent, or Firm* — Paul D. Strain, Esq.; Strain & Strain PLLC (57) ABSTRACT

A hand-held work implement comprises a housing, at least one tool and a combustion engine for driving the tool. The combustion engine has a cylinder and has a piston which drives a crankshaft in rotation about an axis of rotation. The crankshaft drives a fan impeller. The work implement has a handle unit with a handle bar and has an engine unit, these being connected to one another via anti-vibration elements. The combustion engine has a transverse plane which encompasses the cylinder longitudinal axis and which runs parallel to the axis of rotation of the crankshaft. The transverse plane divides the work implement into a front region, in which a section of the tool that projects out of the housing is arranged, and a rear region. The fixing of the anti-vibration element to the cylinder is realized in the front region.

16 Claims, 5 Drawing Sheets

(51) Int. Cl.
  *F02F 1/06* (2006.01)
  *B27B 17/08* (2006.01)
  *B25F 5/00* (2006.01)
  *F02B 63/02* (2006.01)
  *F16F 15/00* (2006.01)
(52) U.S. Cl.
  CPC .............. *F02B 63/02* (2013.01); *F02F 1/065* (2013.01); *F02F 1/242* (2013.01); *F16F 15/00* (2013.01)

(56) References Cited

U.S. PATENT DOCUMENTS

| | | | |
|---|---|---|---|
| 6,799,642 B2 | 10/2004 | Wolf et al. | |
| 6,905,042 B2 | 6/2005 | Eberhardt | |
| 6,994,068 B2 * | 2/2006 | Menzel | F02B 63/02 123/192.1 |
| 7,219,433 B2 * | 5/2007 | Gorenflo | B27B 17/0033 173/162.2 |
| 7,293,330 B2 | 11/2007 | Guip et al. | |
| 7,412,959 B2 * | 8/2008 | Wolf | B27B 17/0033 123/198 E |
| 7,942,212 B2 | 5/2011 | Zimmermann | |
| 8,225,514 B2 | 7/2012 | Guip et al. | |
| 8,567,520 B2 | 10/2013 | Wolf et al. | |
| 8,918,998 B2 * | 12/2014 | Heinzelmann | A01G 3/053 30/208 |
| 2002/0073558 A1 | 6/2002 | Tajima et al. | |
| 2011/0226501 A1 | 9/2011 | Wolf et al. | |
| 2011/0240324 A1 * | 10/2011 | Kondo | B23D 45/16 173/162.2 |
| 2015/0026988 A1 * | 1/2015 | Kurzenberger | B25F 5/006 30/381 |
| 2015/0027745 A1 | 1/2015 | Kurzenberger et al. | |

FOREIGN PATENT DOCUMENTS

| | | |
|---|---|---|
| DE | 10 2007 022 115 A1 | 11/2008 |
| DE | 10 2007 048 887 A1 | 4/2009 |
| DE | 10 2010 011 986 A1 | 9/2011 |

OTHER PUBLICATIONS

Kurzenberger; U.S. PTO Notice of Allowance, U.S. Appl. No. 14/341,997, Dec. 6, 2016, 11 pgs.

* cited by examiner

HAND-HELD WORK IMPLEMENT

CROSS-REFERENCE TO RELATED PATENT APPLICATIONS

This application is based upon and claims the benefit of priority from prior German Patent Application No. 10 2013 012 513.8, filed Jul. 27, 2013, the entire contents of which are incorporated herein by reference in their entirety.

BACKGROUND

The application relates to a hand-held work implement of the generic type, including a hand-held work implement that includes, at least one tool, and a combustion engine for driving the tool.

DE 10 2007 048 887 A1 has disclosed a hand-held work implement, specifically a power saw, in which an anti-vibration element is fixed by way of one end to a handle bar of the handle unit and by way of its other end to a cylinder of the combustion engine. The anti-vibration element is fixed to the cylinder in a rear region of the cylinder, which faces toward a rear handle of the work implement.

SUMMARY OF PREFERRED EMBODIMENTS

It is one object of the application to create a hand-held work implement of the generic type which has an advantageous construction.

This and other objects are achieved by a hand-held work implement according to the application.

In an exemplary embodiment, the hand-held work implement has a housing. The hand-held work implement has at least one tool and has a combustion engine for driving the at least one tool. The tool projects at least partially out of the housing of the work implement. The combustion engine has a cylinder in which a piston is mounted so as to move in reciprocating fashion and the piston drives a crankshaft in rotation about an axis of rotation. The hand-held work implement has a fan impeller that is driven in rotation by the crankshaft. The work implement has a handle unit and an engine unit which, for a vibration decoupling, are connected to one another via at least one anti-vibration element. The engine unit has the combustion engine. The anti-vibration element is fixed by way of a first end to a handle bar of the handle unit and by way of a second end to the cylinder of the combustion engine. The combustion engine has a transverse plane which encompasses the cylinder longitudinal axis and which runs parallel to the axis of rotation of the crankshaft. The combustion engine has a central plane which is arranged perpendicular to the transverse plane and which encompasses the cylinder longitudinal axis, wherein the transverse plane divides the work implement into a front region, in which that section of the tool which projects out of the housing is arranged, and a rear region. The fixing of the anti-vibration element to the cylinder is realized in the front region.

In another exemplary embodiment, the combustion engine of the work implement has a transverse plane which encompasses the cylinder longitudinal axis and which runs parallel to the axis of rotation of the crankshaft. The transverse plane divides the work implement into a front region, in which a section of a tool which projects out of a housing of the work implement is arranged, and a rear region. It is provided that the fixing of the anti-vibration element to the cylinder is realized in the front region. An anti-vibration element can be provided which is of relatively long form.

The anti-vibration element can be arranged such that the anti-vibration element projects into the region of the cylinder. In this way, in the region in which the anti-vibration element is fixed to the handle bar, the handle bar can be arranged so as to extend close to the housing of the work implement and at a small distance from the cylinder. The handle bar projects only slightly beyond the plane of the tool in a lateral direction, which are in the direction of the axis of rotation of the crankshaft of the combustion engine. This is advantageous in particular if the work implement is a power saw and the tool is a saw chain arranged so as to circulate on a guide rail. Owing to the fact that the handle bar is arranged so as to extend close to the housing and at a small distance from the cylinder, it is possible, using the power saw, to perform cutting actions close to a lateral boundary. At the same time, a good damping action is attained owing to the large possible length of the anti-vibration element.

According to a further embodiment, the anti-vibration element, owing to the fact that it is fixed to the cylinder in the front region, is arranged such that a cooling air stream to the combustion engine is not impaired or is only slightly impeded. The guidance of the cooling air in the rear region of the work implement is not impeded by the anti-vibration element. In the rear region of the work implement, the cooling air stream can, by means of corresponding cooling air guides, be guided closely around the cylinder. Good cooling of the combustion engine during operation can be achieved in this way.

In still yet a further embodiment, the anti-vibration element is advantageously fixed to the cylinder on that side of the central plane which is remote from the fan impeller. An outlet opening for cooling air is provided on that side of the central plane which is remote from the fan impeller. On the side of the central plane which faces toward the fan impeller and in the rear region of the work implement, the cooling air stream can flow without being impeded by the anti-vibration element. The cooling air stream is not impeded, or is impeded only slightly, by the anti-vibration element because the anti-vibration element is arranged on the cylinder adjacent to an outlet opening for cooling air. The impairment of the cooling action owing to covered cooling fins or owing to cutouts or the like provided in the cooling fins for the anti-vibration element is only minor. Good cooling of the combustion engine is ensured in this way.

In a further embodiment, the anti-vibration element advantageously comprises a helical spring. An intense damping action can be attained in a small structural space. The helical spring of the anti-vibration element is advantageously arranged entirely in the front region of the work implement. This yields an advantageous construction.

In still another embodiment, an advantageous construction is obtained if, at the location at which the anti-vibration element is fastened to the handle bar, the longitudinal central axis of the helical spring of the anti-vibration element is arranged on the side of the handle bar which is remote from the rear region of the work implement. The handle bar has a side facing away from the rear region and facing toward the front region, and has a side facing toward the rear region and facing away from the front region. The side facing toward the rear region is in this case that side of the handle bar which is situated closer to that section of the tool which projects out of the housing. The side facing toward the rear region of the work implement is that side which is further remote from a section of the tool which projects out of the housing. The side facing toward the rear region of the work implement is in particular that side which is situated closer to and faces toward a rear handle of the work implement.

The handle bar may in this case be arranged partially in the rear region and partially in the front region of the work implement, or may be arranged entirely in the rear region or in the front region.

In yet another embodiment, the anti-vibration element advantageously has a fastening element for fixing to the handle bar. The fastening element is fixed to that side of the handle bar which faces toward that section of the tool which projects out of the housing. The anti-vibration element can in a simple manner be arranged in the front region of the work implement.

By way of a further embodiment, to make it possible to realize an adequate length of the anti-vibration element, it is advantageously provided that the cylinder of the combustion engine has cooling fins, and that at least one cooling fin has a cutout in the region in which the second end of the anti-vibration element is fastened to the cylinder. By means of the cutout, it is possible for adequate structural space to be created for the fastening of the second end of the anti-vibration element to the cylinder. In this way, an anti-vibration element of relatively large length may be used. The handle bar is advantageously arranged so as to extend close to the housing. The handle bar advantageously runs rectilinearly in the region of the fastening of the anti-vibration element. An outward bulge of the handle bar in the region in which the anti-vibration element is fastened can be avoided by means of the cutout in the cooling fin.

According to another embodiment, when the anti-vibration element is arranged on that side of the central plane which is remote from the fan impeller, the anti-vibration element is arranged in a region of the combustion engine at which the cooling air flows off. The cutout in a cooling fin in this region decreases the cooling action of the cooling fins only slightly. In the region of the cutout, the cooling fin is in particular arranged asymmetrically with respect to the central plane. The distance between the outer edge of the cooling fin and the central plane in the region of the cutout advantageously amounts to at most approximately 80% of the distance between the outer edge of the cooling fin and the central plane on the opposite side of the central plane. The distances on the two sides of the central plane are measured in the same section plane arranged perpendicular to the central plane. At least two cooling fins advantageously have a cutout. The anti-vibration element can be arranged on the cylinder such that it does not project, or projects only slightly, beyond the upper contour of the cylinder.

In another embodiment, the combustion engine advantageously has an ignition plug which projects into a combustion chamber formed in the cylinder. To create adequate structural space for the arrangement of the anti-vibration element in the front region of the work implement, it is provided in particular that the ignition plug is arranged on the cylinder in the rear region of the work implement. In this way, it is possible for an anti-vibration element that has a very large extent between its first and its second end to be arranged on the cylinder without the having to adapt the shape of a handle bar. The central plane advantageously intersects the ignition plug. The arrangement of the ignition plug approximately centrally on the cylinder permits a substantially symmetrical arrangement, and thus expedient combustion in the combustion chamber. Owing to the preferred arrangement of the ignition plug centrally at the combustion chamber, the arrangement of a very long anti-vibration element on the cylinder in the rear region of the work implement is possible only if the handle unit, in particular the handle bar, is at a corresponding distance from the cylinder, in particular by way of a corresponding outward bulge. This is however undesirable with regard to the handling of the work implement. In particular if the work implement is a power saw, it should be possible to perform cutting actions even very close to obstructions, for example very close to the ground. It is therefore desirable for the handle bar to run as flat as possible, and as close to the housing of the power saw as possible, in the region in which the anti-vibration element is conventionally arranged. This is made possible by means of the arrangement of the anti-vibration element in the front region of the work implement.

In yet another embodiment of the application, the combustion engine advantageously has a decompression valve by means of which, during starting, the back pressure in the combustion chamber can be reduced in order to facilitate the starting process. The decompression valve is advantageously arranged on the cylinder in the front region of the work implement. The decompression valve normally requires less structural space than the ignition plug, such that the arrangement of the anti-vibration element and of the decompression valve in the front region of the work implement makes it possible to realize a structural space-saving arrangement. It may however also be provided that the decompression valve is arranged on one side of the central plane. The decompression valve is accordingly arranged laterally on the cylinder. The ignition plug can be arranged in the rear region of the work implement even in the case of a lateral arrangement of the decompression valve.

In still another embodiment, the fan impeller advantageously conveys a cooling air stream along the cylinder. In particular, the cooling air stream flows out of the housing of the work implement in the front region of the work implement and on that side of the central plane which is remote from the fan impeller. In particular, the anti-vibration element is arranged in the region in which the cooling air stream exits the work implement. The cooling air stream in the housing is not influenced, or is influenced only slightly, by the anti-vibration element.

In a further embodiment, the proposed arrangement of the anti-vibration element is advantageous in particular for a work implement whose cylinder longitudinal axis, in a set-down position, encloses an angle of greater than approximately 60° with a set-down surface. The angle is in particular measured in the rear region of the work implement and is less than 90°. The cylinder of the work implement is accordingly arranged so as to be tilted rearward, which is toward the rear region of the work implement. Owing to the inclination of the cylinder longitudinal axis, the anti-vibration element can be fixed to the cylinder in an effective manner in the front region of the work implement. The longitudinal central axis of the anti-vibration element can thus be arranged in particular approximately perpendicular to the central plane. This yields an expedient introduction of force and a good damping action. The proposed arrangement of an anti-vibration element is advantageous in particular for a work implement which has a rear handle which is arranged in the rear region of the work implement.

In another embodiment, the hand-held work implement has the anti-vibration element fixed to the cylinder on that side of the central plane which is remote from the fan impeller.

In still yet another embodiment, the hand-held work implement has the anti-vibration element comprises a helical spring.

In yet a further embodiment, the hand-held work implement has the helical spring of the anti-vibration element is arranged entirely in the front region of the work implement.

In another embodiment according to the application, the hand-held work implement has at the location at which the anti-vibration element is fastened to the handle bar, the longitudinal central axis of the helical spring of the anti-vibration element is arranged on that side of the handle bar which is remote from the rear region of the work implement.

In still a further embodiment, the hand-held work implement has the anti-vibration element has a fastening element for fixing to the handle bar, wherein the fastening element is fixed to that side of the handle bar which faces toward that section of the tool which projects out of the housing.

In another embodiment, the hand-held work implement has the cylinder of the combustion engine has cooling fins, and in that at least one cooling fin has a cutout in the region in which the second end of the anti-vibration element is fastened to the cylinder.

According to a further embodiment, the hand-held work implement has the distance between the outer edge of the cooling fin and the central plane in the region of the cutout amounts to at most approximately 80% of the distance between the outer edge of the cooling fin and the central plane on the opposite side of the central plane.

According to an embodiment, the hand-held work implement has at least two cooling fins have a cutout.

By way of a further embodiment, the hand-held work implement has the combustion engine has an ignition plug which projects into a combustion chamber formed in the cylinder, wherein the ignition plug is arranged on the cylinder in the rear region of the work implement.

In yet still a further embodiment, the hand-held work implement has the central plane intersects the ignition plug.

According to another embodiment, the hand-held work implement has the combustion engine has a decompression valve that is arranged on the cylinder in the front region of the work implement.

In another embodiment, the hand-held work implement has the combustion engine has a decompression valve that is arranged on one side of the central plane of the combustion engine.

Yet a further embodiment provides that the hand-held work implement has the fan impeller conveys a cooling air stream along the cylinder, wherein the cooling air stream flows out of the housing of the work implement in the front region of the work implement and on that side of the central plane which is remote from the fan impeller.

In another embodiment, the hand-held work implement has a set-down position in which the work implement stands on a planar, horizontal set-down surface, and, in the set-down position, the cylinder longitudinal axis encloses with the set-down surface an angle of greater than approximately 60°.

In still a further embodiment, the hand-held work implement has the angle is measured in the rear region of the work implement, and the angle is less than 90°.

By way of another embodiment, the hand-held work implement has a rear handle which is arranged in the rear region of the work implement.

Further objects, features, and advantages of the present application will become apparent from the detailed description of preferred embodiments which is set forth below, when considered together with the figures of drawing.

BRIEF DESCRIPTION OF THE DRAWINGS

An exemplary embodiment of the invention will be explained below with reference to the drawing, in which.

DETAILED DESCRIPTION OF PREFERRED EMBODIMENTS

Figure 1:
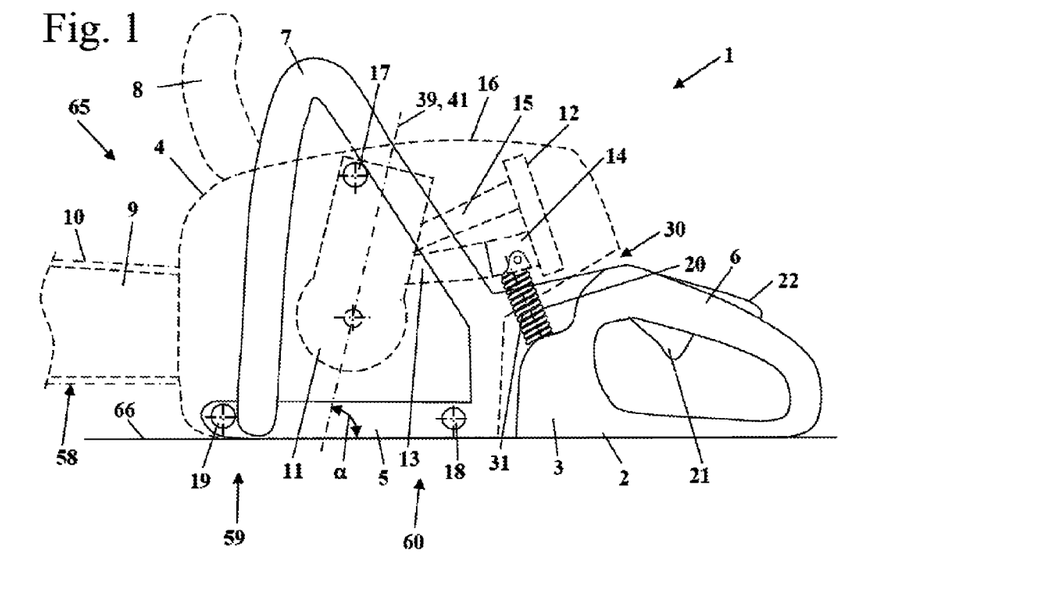
FIG. 1 shows a schematic side view of a power saw.

Turning to the figures of drawing, FIG. 1 schematically shows a power saw 1 as an exemplary embodiment of a hand-held work implement. The power saw 1 has a handle unit 2 and an engine unit 16 which are decoupled from one another in terms of vibrations. In FIG. 1, for improved clarity, the engine unit 16 is indicated by a dashed line, and the handle unit 2 is shown by way of a solid line. In the exemplary embodiment, the handle unit 2 comprises a rear handle 6 and a handle bar 7. The handle unit 2 also comprises a fuel tank 3, and a web 5. One end of the handle bar 7 is fixed to the web 5. In the exemplary embodiment, the handle unit 2 and the engine unit 16 are decoupled in terms of vibrations by four anti-vibration elements 17, 18, 19, 20. Some other number of anti-vibration elements may also be advantageous. The anti-vibration elements 17 to 20 may comprise in each case at least one helical spring. In particular, however, the anti-vibration elements 18 and 19 may alternatively or additionally also have elements composed of plastic or rubber.

The power saw 1 has a housing 4 that may be formed by elements of the handle unit 2 and elements of the engine unit 16. In the housing 4 there is arranged a drive engine which is in the form of a combustion engine 11. In the exemplary embodiment, the combustion engine 11 is a single-cylinder engine. The combustion engine 11 is in particular a two-stroke engine. The combustion engine 11 may however also be a four-stroke engine, in particular a mixture-lubricated four-stroke engine. A first anti-vibration element 17 is connected to the handle bar 7 and to the combustion engine 11. The anti-vibration elements 18 and 19 are arranged on the web 5 of the handle unit 2. The anti-vibration element 20 is fixed to the handle unit 2 in the region of the fuel tank 3. The anti-vibration elements 17 to 20 bridge a vibration gap 30 formed between the handle unit 2 and the engine unit 16, which vibration gap permits relative movements between the handle unit 2 and the engine unit 16. As shown in FIG. 1, the anti-vibration element 20 comprises a helical spring 31.

The combustion engine 11 draws in combustion air from the environment via an air filter 12. In the exemplary embodiment, the combustion engine 11 is in the form of an engine that operates with a scavenging gas shield, and has an intake duct 13 for the supply of fuel/air mixture. The supply of fuel is realized by means of a carburetor 14 in which a section of the intake duct 13 is formed. An air duct 15 is provided for drawing in substantially fuel-free combustion air. The combustion engine 11 drives a saw chain 10 which is arranged so as to circulate on a guide rail 9, and which forms the tool of the power saw 1. The saw chain 10 has a section 58 which projects out of the housing 4 of the power saw 1. A hand protection bar 8 is arranged on that side of the handle bar 7 which faces toward the saw chain 10. The hand protection bar 8 may be mounted so as to be pivotable and may serve for the actuation of a brake device (not shown) for the saw chain 10.

FIG. 1 shows the power saw 1 in a set-down position 65. In the set-down position 65, the power saw 1 stands on a set-down surface 66 which is arranged horizontally and which is of planar form. The combustion engine 11 has a cylinder longitudinal axis 39 which, in the side view in FIG. 1, coincides with a transverse plane 41 of the combustion engine 11. The transverse plane 41 divides the power saw 1 into a front region 59, in which that section 58 of the saw chain 10 which projects out of the housing 4 is arranged, and a rear region 60. In the exemplary embodiment, the rear handle 6 is arranged in the rear region 60 of the power saw 1.

As shown in FIG. 1, in the set-down position 65, the cylinder longitudinal axis 39 is inclined with respect to the set-down surface 66. The cylinder longitudinal axis 39 encloses an angle α, which is advantageously greater than 60°, with the set-down surface 66. The angle α is in particular less than 90°, and is measured in the rear region of the power saw 1. The upper region of the cylinder longitudinal axis 39 in the set-down position 65 is arranged closer to the rear handle 6 than the lower region of the cylinder longitudinal axis 39 in the set-down position 65.

A throttle lever 21 and a throttle lever lock 22 are pivotably mounted on the rear handle 6. The throttle lever 21 serves for the control of the combustion engine 11 and can only be actuated when the throttle lever lock 22 is depressed.

Figure 2:
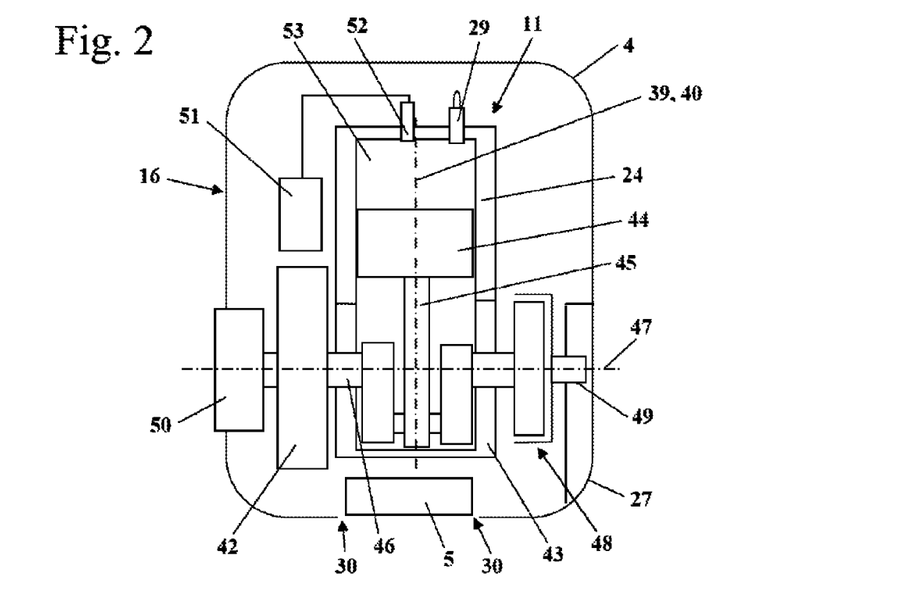
FIG. 2 shows a schematic sectional illustration of the power saw from FIG. 1.

FIG. 2 schematically shows the construction of the combustion engine 11. FIG. 2 also shows the arrangement of the vibration gap 30 between the web 5 and the engine unit 16. As shown in FIG. 2, the combustion engine 11 has a cylinder 24 and a crankcase 43. In the cylinder 24 there is formed a combustion chamber 53 which is delimited by a piston 44, said piston being mounted in the cylinder 24 so as to move in reciprocating fashion. Via a connecting rod 45, the piston 44 drives a crankshaft 46, which is rotatably mounted in the crankcase 43, in rotation about an axis of rotation 47. A decompression valve 29 and an ignition plug 52 project into the combustion chamber 53. In the schematic sectional illustration shown in FIG. 2, the cylinder longitudinal axis 39 coincides with a central plane 40 of the combustion engine 11. The transverse plane 41 (FIG. 1) corresponds to the plane of the drawing. The transverse plane 41 encompasses the cylinder longitudinal axis 39 and runs parallel to the axis of rotation 47 of the crankshaft 46. In the exemplary embodiment, the transverse plane 41 encompasses the axis of rotation 47 of the crankshaft. It is however also possible for an offset to be provided between the cylinder longitudinal axis 39 and the axis of rotation 47, such that the axis of rotation 47 of the crankshaft 46 runs parallel to, and at a distance from, the transverse plane 41. The central plane 40 is arranged perpendicular to the transverse plane 41 and likewise comprises the cylinder longitudinal axis 39.

Outside the crankcase 43, a fan impeller 42 is fixed to the crankshaft 46, which fan impeller serves for the delivery of cooling air. The fan impeller 42 also serves as a flywheel. On the fan impeller 42 there are arranged magnets (not shown) that induce a voltage in an ignition module 51 arranged at the outer circumference of the fan impeller 42. The ignition module 51 supplies ignition energy to the ignition plug 52, said ignition energy being induced in the ignition module 51 by the fan impeller 42. The combustion engine 11 furthermore has a starting device 50 which is arranged on that side of the fan impeller 42 which is remote from the crankcase 43. At that side of the crankcase 43 which is remote from the fan impeller 42, there is provided a centrifugal clutch 48 which, after a constructionally predefined rotational speed is exceeded, connects the crankshaft 46 rotationally conjointly to a pinion 49. The pinion 49 drives the saw chain 10 such that the latter circulates on the guide rail 9. The pinion 49 is covered by a sprocket cover 27. That section of the saw chain 10 which is arranged on the pinion 49 thus does not project out of the housing 4.

Figure 3:
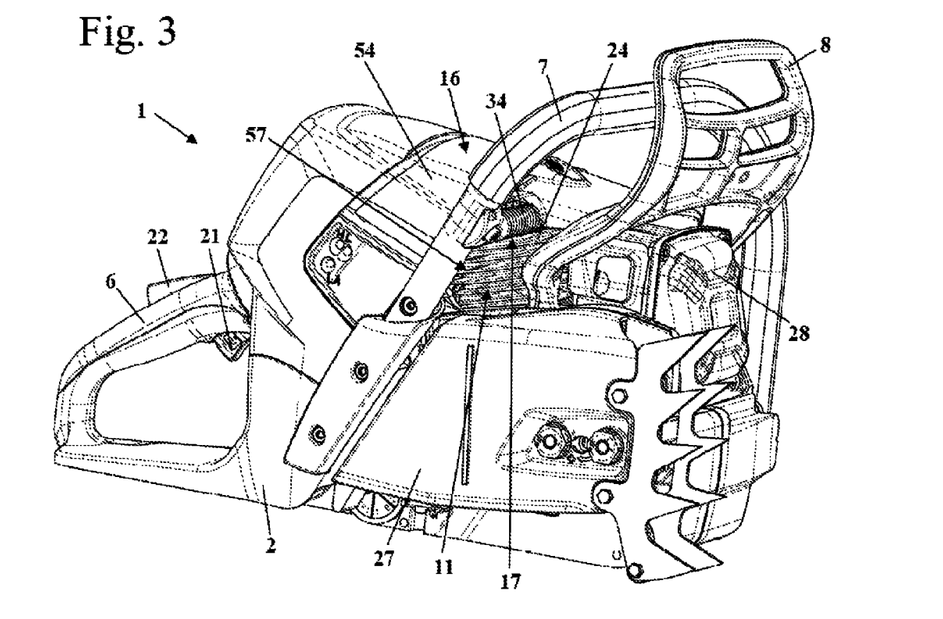
FIG. 3 shows a perspective illustration of the power saw from FIG. 1.

FIG. 3 shows the structural design of the power saw 1 in detail. The guide rail 9 and the saw chain 10 are not shown in FIG. 3. As shown in FIG. 3, the combustion engine 11 is covered by a cover 54. An exhaust silencer 28 is arranged on the cylinder 24 of the combustion engine 11. The exhaust silencer 28 is arranged in the front region 59 (FIG. 1) of the power saw 1. In the region between the hand protection bar 8 and handle bar 7, the cover 54 does not extend quite as far as the exhaust silencer 28 and instead leaves a region free above the sprocket cover 27, which region forms an outlet opening 57 for cooling air. The anti-vibration element 17 is arranged in the outlet opening 57 and comprises a helical spring 34.

Figure 4:
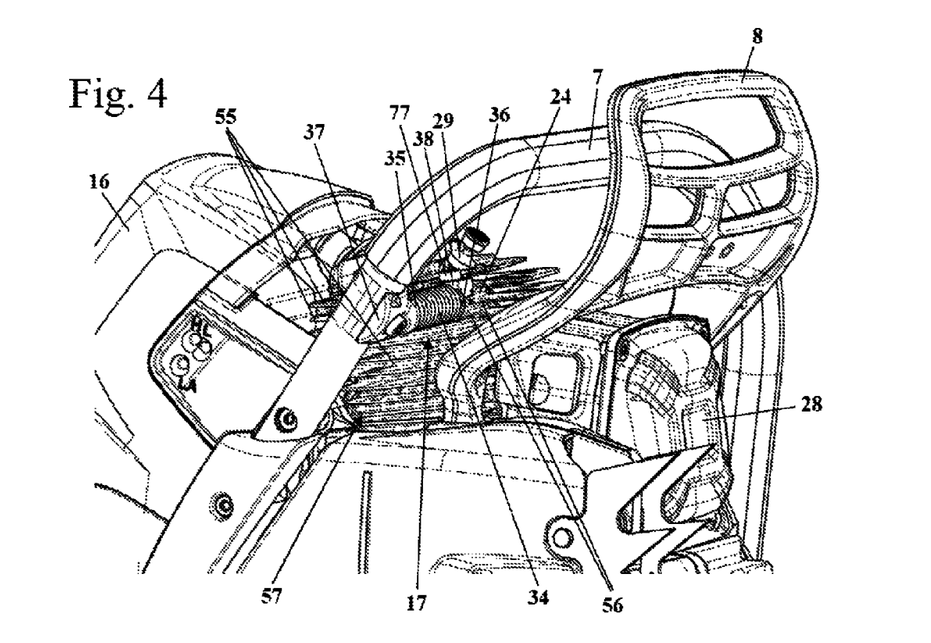
FIG. 4 shows an enlarged detail illustration of the power saw from FIG. 3.

As shown in FIG. 4, the helical spring 34 is fixed by way of a first end 35 to the handle bar 7 and by way of a second end 36 to the cylinder 24 of the combustion engine 11. The decompression valve 29 projects out of the cylinder 24 adjacent to the second end 36. A fastening element 37 is held on the helical spring 34 at the first end 35, and a fastening element 38 is held on the second end 36. The fastening elements 37 and 38 each have, on their outer circumference, a spiral-shaped depression by which they are screwed into the helical springs 34. The anti-vibration element 17 is fixed by way of the fastening element 37 to the handle bar 7 and by way of the fastening element 38 to the cylinder 24. The fastening element 37 is arranged on that side of the handle bar 7 which faces toward that section 58 of the saw chain 10 (FIG. 1) which projects out of the housing 4. As is also shown in FIG. 4, the cylinder 24 has a multiplicity of cooling fins 55.

Figure 5:
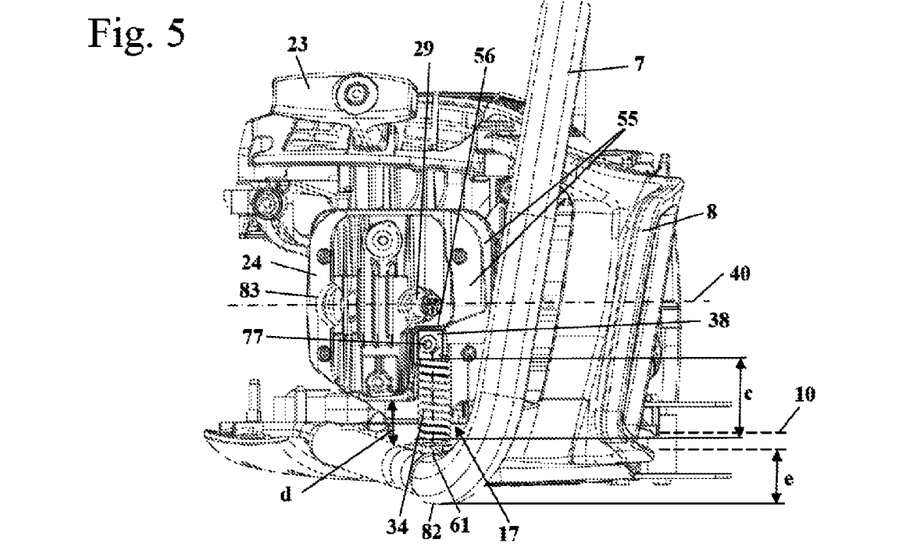
FIG. 5 shows a plan view of the power saw from FIG. 1, with a cover removed.

FIG. 5 shows the fastening element 38. The fastening element 38 is mounted on a cooling fin 55 and is fixed to at least one cooling fin 55 by means of a fastening screw 77. The fastening element 38 is arranged adjacent to the outlet opening 57 for the cooling air (FIG. 4). By virtue of the fact that the fastening element 38 is arranged in the outflow region for the cooling air, the impairment of the cooling action by the fastening element 38 is only minor. As is also shown in FIG. 5, the helical spring 34 of the anti-vibration element 17 has a length c. The length c is measured parallel to a longitudinal central axis 61 of the helical spring 34. Adjacent to the anti-vibration element 17, the cylinder 24 is at a distance d from the handle bar 7. The distance d is measured to the cooling fins 55 that have the cutout 56 into which the anti-vibration element 17 extends. As shown in FIG. 5, the distance d is considerably smaller than the length c. By virtue of the fact that the anti-vibration element 17 extends into the cutout 56, it is possible, on that side of the housing 4 (FIG. 1) to which the guide rail 9 is fixed, for the handle bar 7 to be of rectilinear form and to be arranged so as to extend close to the housing 4. The distance e, measured perpendicular to the central plane 40, between an outer side 82 of the handle bar 4 and the saw chain 10 is small. It is possible by means of the saw chain 10 to perform cutting actions close to obstructions, for example close to the ground. As is also shown in FIG. 5, the central plane 40 intersects the decompression valve 29 and a receptacle 83 for the ignition plug 52 (FIG. 2) that is not shown in FIG. 5.

Figure 6:
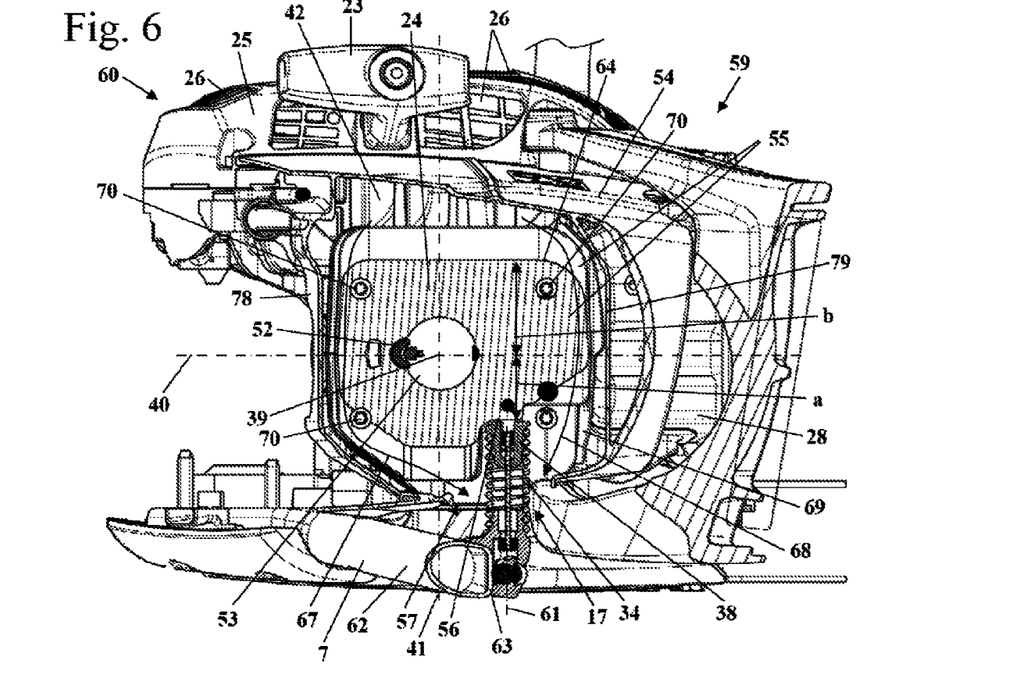
FIG. 6 shows a section through the work implement perpendicular to the cylinder longitudinal axis.

The sectional illustration in FIG. 6 shows the central plane 40 and the transverse plane 41. As shown in FIG. 6, the anti-vibration element 17 is arranged in the front region 59 of the power saw 1. The anti-vibration element 17 is fixed to the cylinder 24 in the front region 59 of the power saw 1. The anti-vibration element 17 is thus also fixed to the cylinder 24 in the front region of the cylinder 24. In the exemplary embodiment, the cylinder 24 is arranged such that an outlet from the combustion chamber 53 is arranged in the front region of the cylinder 24, and an inlet (not shown) into the crankcase 43 is arranged in a rear region, which faces toward the rear handle 6, of the cylinder 24. In the exemplary embodiment, the fastening element 38 is arranged entirely in the front region 59 of the power saw 1. It may however also be provided that only that region of the fastening element 38 which serves for the fixing to the cylinder 24 is arranged in the front region 59 of the power saw 1. As is also shown in FIG. 6, the anti-vibration element 17 is arranged on that side of the central plane 40 which is remote from the fan impeller 42. As is shown in FIG. 6, a starter handle 23 for the starter device 50 projects out of the housing 4. The starter handle 23 projects out of a fan impeller cover 25 which is part of the housing 4. The fan impeller cover 25 has a multiplicity of cooling air openings 26 through which the fan impeller 42 draws in cooling air from the environment. As is shown in FIG. 6, a partition 78 is arranged adjacent to the cylinder 24 in the rear region 60 of the power saw 1, which partition separates the cylinder 24 from the region in which the carburetor 14 (FIG. 1) is arranged. The partition 78 is arranged so as to extend close to the cylinder 24. The partition 78 is advantageously formed on the cover 54. Cooling air that is delivered by the fan impeller 42 flows through closely along the cylinder 24, between the cooling fins 55, and cools the cylinder 24. The flow direction of the cooling air in the rear region 60 is schematically indicated by an arrow 67.

In the front region 59, a shield plate 69 is arranged adjacent to the cylinder 24, which shield plate runs between the exhaust silencer 28 and the cylinder 24. On the cover 54 there is integrally formed a partition 79, which is likewise arranged so as to extend closely around the cylinder 24. In this way, it is also the case in the front region 59 of the power saw 1 that the cooling air delivered by the fan impeller 42 is guided closely around the cylinder 24 and through the intermediate spaces formed between the cooling fins 55. This is schematically indicated by an arrow 68. The cooling air that is delivered by the fan impeller exits the power saw 1 at the outlet opening 57, which is also shown in FIG. 4. The anti-vibration element 17 is arranged in the region of the outlet opening 57. In the exemplary embodiment, the anti-vibration element 17 projects through the outlet opening 57.

Figure 7:
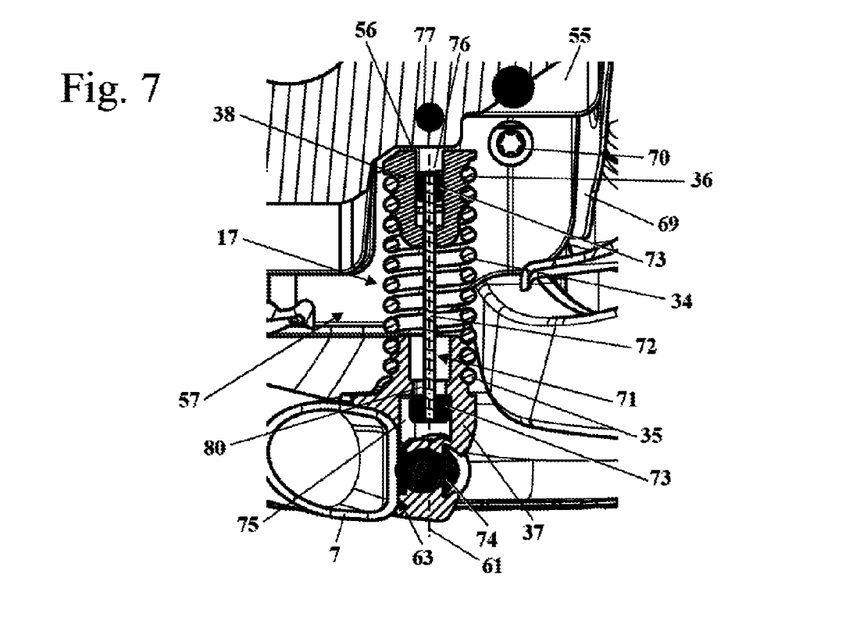
FIG. 7 shows an enlarged sectional illustration of the anti-vibration element from FIG. 6.

As shown in FIG. 6, the helical spring 34 of the anti-vibration element 17 is arranged entirely on that side of the central plane 40 which is remote from the fan impeller 42. The helical spring 34 runs entirely in the front region 59 of the power saw 1. The anti-vibration element 17 has the longitudinal central axis 61, which is arranged in the front region 59. In the exemplary embodiment, the longitudinal central axis 61 runs parallel to the transverse plane 41. The handle bar 7 has a side 62, which faces toward the rear region 60, and an opposite side 63, which is remote from the rear region 60. Owing to the inclined profile of the handle bar 7 with respect to the transverse plane 41, both sides 62 and 63 are in this case arranged partially in the front region 59 and partially in the rear region 60. In all cross sections through the handle bar 7 perpendicular to the longitudinal extent thereof, the side facing toward the rear region 60 is further remote from that section 58 of the saw chain 10 (FIG. 1) which projects out of the housing 4 than the side 63 which is remote from the rear region 60. The fastening element 37 of the anti-vibration element 17 is arranged on that side 63 of the handle bar 7 which is remote from the rear region 60. As shown in FIG. 7, the fastening element 37 is fixed to the handle bar 7 by way of a fastening screw 74, which is likewise arranged on that side 63 of the handle bar 7 which is remote from the rear region 60.

The fastening element 38 is arranged on the cylinder 24 in the region of a cutout 56 of the cooling fins 55. The fastening screw 77 by means of which the second fastening element 38 is fastened to the cylinder 24 is shown in section in FIGS. 6 and 7. As shown in FIGS. 4 to 6, multiple cooling fins 55, in the exemplary embodiment four cooling fins 55, have a cutout 56 in which the fastening element 38 is arranged. The helical spring 34 may have a relatively large length. At the same time, the handle bar 7 can run in rectilinear fashion on the outside of the power saw 1, as shown in FIG. 5. As shown in FIG. 6, the cooling fins 55 are of asymmetrical design in the region of the cutout 56. The outer edge 64 of the cooling fins 55 is, at the cutout 56, at a distance a from the central plane 40. The distance a is in this case measured perpendicular to the transverse plane 41. On the opposite side of the central plane 40, specifically in the same section plane perpendicular to the central plane 40, the outer edge 64 is at a distance b from the central plane 40. The distance b is considerably greater than the distance a. The distance a is advantageously at most approximately 80% of the distance b. The distance a is in particular at most approximately 70% of the distance b. As is also shown in FIG. 6, in the exemplary embodiment, there are arranged on the cylinder 24 four fastening screws 70 by means of which the cylinder 24 is screwed to the crankcase 43 (FIG. 2).

FIG. 7 shows the anti-vibration element 17 in an enlarged illustration. As is also shown in FIG. 6, the longitudinal central axis 61 of the anti-vibration element 17, which corresponds to the longitudinal central axis of the helical spring 34, is arranged at that side 63 of the handle bar 7 which is remote from the rear region 60 of the power saw 1. It is advantageously the case that the longitudinal central axis 61 is arranged on that side 63 of the handle bar 7 which is remote from the rear region 60 of the power saw 1 at least at the location at which the anti-vibration element 17 is fastened to the handle bar 7, that is to say in the region of the fastening screw 74. In the exemplary embodiment, the longitudinal central axis 61 of the helical spring 34 runs parallel to the transverse plane 41. The longitudinal central axis 61 advantageously runs over the entire length of the anti-vibration element 17 in the front region 59 of the power saw 1. As shown in FIG. 7, the fastening element 37 which is arranged at the first end 35 of the helical spring 34 is fixedly screwed to the handle bar 7 by means of the fastening screw 74. The fastening screw 74 is screwed in the direction of the rear region 60 of the power saw 1 from the side facing toward the saw chain 10.

A pull-off prevention means 71 extends through the helical spring 34 from the fastening element 37 to the fastening element 38. The pull-off prevention means 71 comprises a securing cable 72, which is advantageously in the form of a steel cable that is rigid under shear. At its ends, the securing cable 72 has nipples 73 which are held fixedly on the securing cable 72. A receptacle 75 for a nipple 73 is formed on the fastening element 37. The nipple 73 of the fastening element 37 at the handle bar 7 can be pushed into the receptacle 75 laterally, that is to say perpendicular to the longitudinal central axis 61. On the fastening element 38 there is provided a receptacle 76 for the second nipple 73, which second nipple can advantageously likewise be pushed laterally into the fastening element 38. On the base of the receptacle 75 there is formed an opening 80 which is large enough that the nipple 73 to be arranged on the fastening element 38 can be pushed through the opening 80 during the installation process, such that the pull-off prevention means 71 can be installed.

Figure 8:
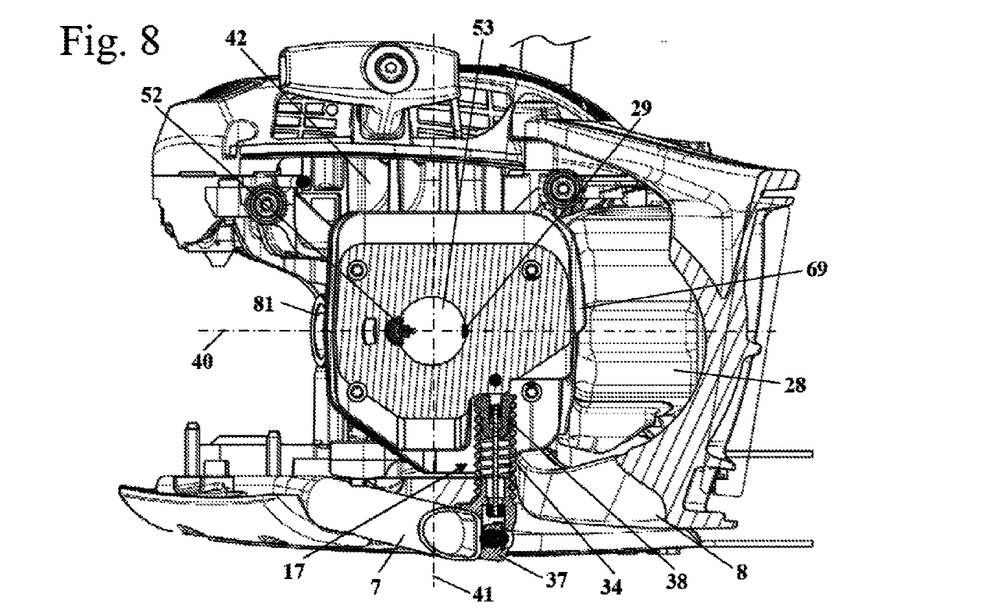
FIG. 8 shows the sectional illustration from FIG. 6, wherein the cover of the power saw has been removed.

FIG. 8 shows the power saw 1 with the cover 54 removed. On the cylinder 24 it is possible to see an intake pipe 81 which opens into the crankcase 43 (FIG. 2). In FIG. 8 it is also possible to see the arrangement of the decompression valve 29, whose section which projects into the combustion chamber 53 is illustrated in section.

Figure 9:
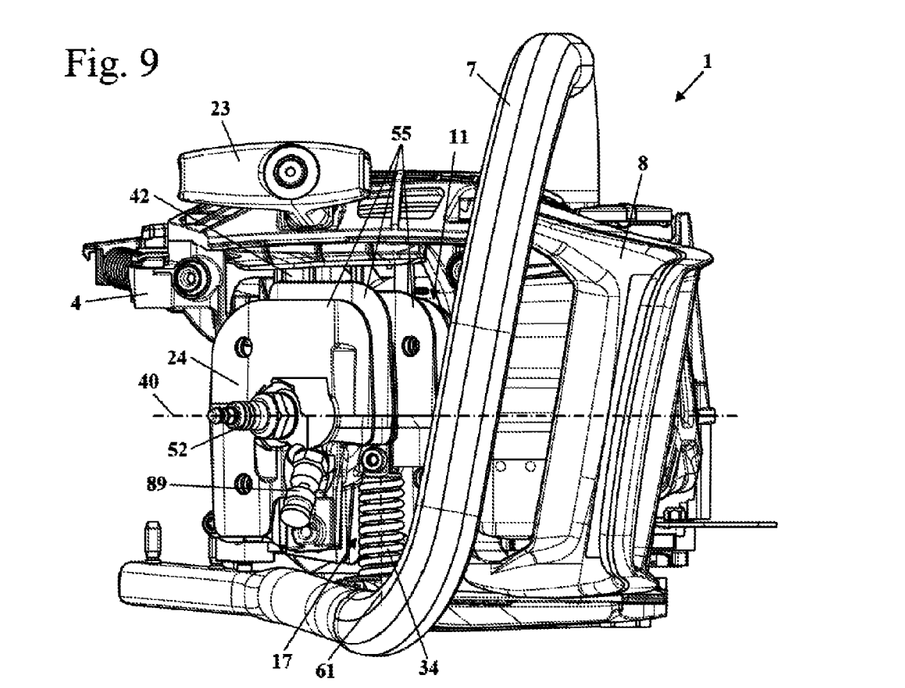
FIG. 9 shows a plan view of an exemplary embodiment of a power saw with a cover removed.

FIG. 9 shows an exemplary embodiment of a power saw 1 in a plan view. The construction of the power saw shown in FIG. 9 substantially corresponds to the construction of the power saw 1 shown in FIGS. 1 to 8, wherein corresponding elements are denoted by the same reference signs in all of the figures. The cylinder 24 of the combustion engine 11 is arranged in a tilted configuration in the housing 4 of the power saw 1, as schematically illustrated in FIG. 1. The anti-vibration element 17 is arranged on that side of the central plane 40 which is remote from the fan impeller 42. On the cylinder 24 there is arranged an ignition plug 52, which is intersected by the central plane 40. On the cylinder 24 there is held a decompression valve 89 which is arranged on that side of the central plane 40 in which the anti-vibration element 17 is also arranged. In the set-down position 65 of the power saw 1 (FIG. 1), the decompression valve 89 projects obliquely upward away from the central plane 40.

Figure 10:
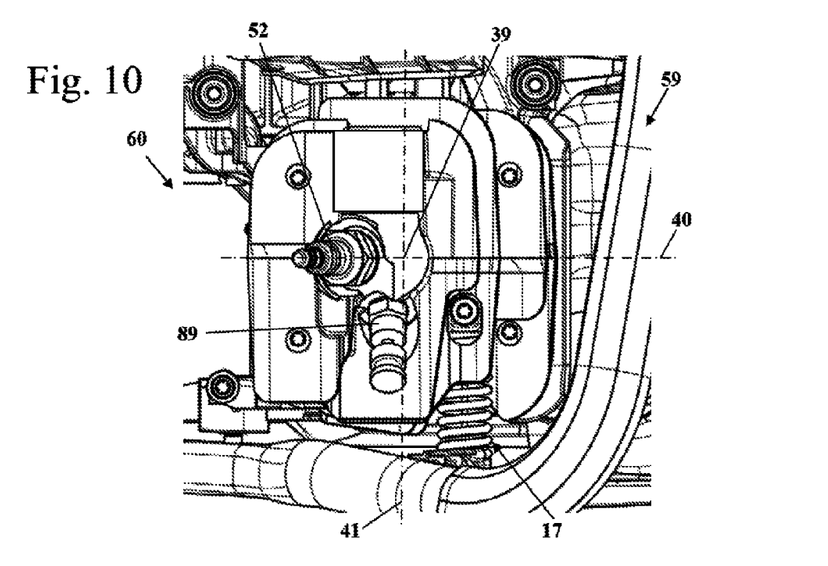
FIG. 10 shows a plan view of the cylinder of the power saw from FIG. 9 in the direction of the longitudinal central axis of the cylinder.

As shown in FIG. 10, the decompression valve 89 is situated directly adjacent to the transverse plane 41 in the rear region 60 of the power saw 1. The ignition plug 52 is likewise arranged in the rear region 60, whereas the anti-vibration element 17 is situated in the front region 59 of the power saw 1.

The foregoing description of preferred embodiments of the application has been presented for purposes of illustration and description only. It is not intended to be exhaustive or to limit the application to the precise form disclosed, and modifications and variations are possible and/or would be apparent in light of the above teachings or may be acquired from practice of the application. The embodiments were chosen and described in order to explain the principles of the application and its practical application to enable one skilled in the art to utilize the application in various embodiments and with various modifications as are suited to the particular use contemplated. It is intended that the scope of the application be defined by the claims appended hereto and that the claims encompass all embodiments of the application, including the disclosed embodiments and their equivalents.

The invention claimed is:

1. A hand-held work implement, comprising:
   a housing,
   at least one tool and
   a combustion engine for driving the at least one tool, wherein the tool projects at least partially out of the housing of the work implement, wherein the combustion engine has a cylinder in which a piston is mounted so as to move in reciprocating fashion, wherein the piston drives a crankshaft in rotation about an axis of rotation, wherein the hand-held work implement has a fan impeller that is driven in rotation by the crankshaft, wherein the hand-held work implement has a handle unit and an engine unit which, for a vibration decoupling, are connected to each other via at least one anti-vibration element, wherein the engine unit comprises the combustion engine, wherein the anti-vibration element is fixed by way of a first end thereof to a handle bar of the handle unit and by way of a second end thereof to the cylinder of the combustion engine, wherein the combustion engine has a transverse plane which encompasses a cylinder longitudinal axis and which runs parallel to the axis of rotation of the crankshaft, and wherein the combustion engine has a central plane which is arranged perpendicular to the transverse plane and which encompasses the cylinder longitudinal axis, wherein the transverse plane divides the work implement into a front region, in which that section of the tool which projects out of the housing is arranged, and a rear region,
wherein the fixing of the anti-vibration element to the cylinder is realized in the front region.

2. The hand-held work implement according to claim 1, wherein the anti-vibration element is fixed to the cylinder on that side of the central plane which is remote from the fan impeller.

3. The hand-held work implement according to claim 1, wherein the anti-vibration element comprises a helical spring.

4. The hand-held work implement according to claim 3, wherein the helical spring of the anti-vibration element is arranged entirely in the front region of the work implement.

5. The hand-held work implement according to claim 3, wherein, at the location at which the anti-vibration element is fastened to the handle bar, a longitudinal central axis of the helical spring of the anti-vibration element is arranged on that side of the handle bar which is remote from the rear region of the work implement.

6. The hand-held work implement according to claim 1, wherein the anti-vibration element has a fastening element for fixing to the handle bar, wherein the fastening element is fixed to that side of the handle bar which faces toward that section of the tool which projects out of the housing.

7. The hand-held work implement according to claim 1, wherein the cylinder of the combustion engine has cooling fins, and in that at least one of the cooling fins has a cutout in the region in which the second end of the anti-vibration element is fastened to the cylinder.

8. The hand-held work implement according to claim 7, wherein the distance between an outer edge of the cooling fin and the central plane in the region of the cutout amounts to at most approximately 80% of the distance between the outer edge of the cooling fin and the central plane on the opposite side of the central plane.

9. The hand-held work implement according to claim 7, wherein at least two of the cooling fins have a cutout.

10. The hand-held work implement according to claim 1, wherein the combustion engine has an ignition plug which projects into a combustion chamber formed in the cylinder, wherein the ignition plug is arranged on the cylinder in the rear region of the hand-held work implement.

11. The hand-held work implement according to claim 10, wherein the central plane intersects the ignition plug.

12. The hand-held work implement according to claim 1, wherein the combustion engine has a decompression valve that is arranged on the cylinder in the front region of the work implement.

13. The hand-held work implement according to claim 1, wherein the combustion engine has a decompression valve that is arranged on one side of the central plane of the combustion engine.

14. The hand-held work implement according to claim 1, wherein the fan impeller conveys a cooling air stream along the cylinder, wherein the cooling air stream flows out of the housing of the work implement in the front region of the work implement and on that side of the central plane which is remote from the fan impeller.

15. The hand-held work implement according to claim 1, wherein the hand-held work implement has a rear handle which is arranged in the rear region of the work implement.

16. A hand-held work implement, comprising:
a housing,
at least one tool,
an engine unit and
a handle unit,
wherein the engine unit comprises a combustion engine for driving the at least one tool, wherein the tool projects at least partially out of the housing of the work implement, wherein the combustion engine has a cylinder in which a piston is mounted so as to move in reciprocating fashion, wherein the piston drives a crankshaft in rotation about an axis of rotation, wherein the hand-held work implement has a fan impeller that is driven in rotation by the crankshaft,
wherein the engine unit and the handle unit, for a vibration decoupling, are connected to each other via at least one anti-vibration element, wherein the anti-vibration element is fixed by way of a first end to a handle bar of the handle unit and by way of a second end to the cylinder of the combustion engine, wherein the combustion engine has a transverse plane which encompasses a cylinder longitudinal axis and which runs parallel to the axis of rotation of the crankshaft, and wherein the combustion engine has a central plane which is arranged perpendicular to the transverse plane and which encompasses the cylinder longitudinal axis, wherein the transverse plane divides the work implement into a front region, in which that section of the tool which projects out of the housing is arranged, and a rear region,
wherein the fixing of the anti-vibration element to the cylinder is realized in the front region,
wherein the hand-held work implement is a power saw and the at least one tool is a saw chain.

* * * * *